US009755860B2

(12) United States Patent
Kao et al.

(10) Patent No.: US 9,755,860 B2
(45) Date of Patent: Sep. 5, 2017

(54) METHOD OF PERFORMING UPLINK CHANNEL ESTIMATION AND BASE STATION USING THE SAME

(71) Applicant: Industrial Technology Research Institute, Hsinchu (TW)

(72) Inventors: Ming-Hsuan Kao, Changhua County (TW); Szu-Yu Wang, New Taipei (TW); Ming-Fu Tang, Hsinchu (TW); Bor-Ching Su, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 82 days.

(21) Appl. No.: 15/047,643

(22) Filed: Feb. 19, 2016

(65) Prior Publication Data
US 2017/0222835 A1    Aug. 3, 2017

(30) Foreign Application Priority Data

Jan. 29, 2016 (TW) .............................. 105102825 A

(51) Int. Cl.
*H04L 25/02* (2006.01)
*H04W 74/08* (2009.01)
(Continued)

(52) U.S. Cl.
CPC ...... *H04L 25/0228* (2013.01); *H04L 27/2601* (2013.01); *H04W 72/044* (2013.01); *H04W 74/0833* (2013.01)

(58) Field of Classification Search
None
See application file for complete search history.

(56) References Cited

U.S. PATENT DOCUMENTS 7,272,192 B2    9/2007    Lindskog et al.
7,460,605 B2    12/2008    Candy et al.
(Continued)

FOREIGN PATENT DOCUMENTS

CN    103457647    12/2013
CN    103560983    2/2014
(Continued)

OTHER PUBLICATIONS

"Office Action of Taiwan Counterpart Application," dated Apr. 18, 2017, p. 1-p. 8, in which the listed references were cited.
(Continued)

*Primary Examiner* — Alex Skripnikov
(74) *Attorney, Agent, or Firm* — Jianq Chyun IP Office

(57) ABSTRACT

A method of performing uplink channel estimation and a base station using the same are provided. The method is applicable to serve at least two UE equipments (UEs) in a communication system. The at least two UEs are located in at least two beam sectors respectively. The base station comprises a plurality of antennas. The method includes: determining whether multipath of the at least two UEs passing through a same beam sector; assigning a first and a second training sequence for a first UE and a second UE of the at least two UEs respectively; receiving a reference signal, wherein the reference signal is transmitted by the first UE and the second UE according to the first and the second training sequence; and performing channel estimation for the first UE and the second UE according to the reference signal, the first and the second training sequence.

22 Claims, 7 Drawing Sheets

(51) Int. Cl.
  *H04L 27/26* (2006.01)
  *H04W 72/04* (2009.01)

(56) References Cited

U.S. PATENT DOCUMENTS

| | | | |
|---|---|---|---|
| 8,195,112 | B1 | 6/2012 | Zhang et al. |
| 8,374,072 | B2 | 2/2013 | Gaal et al. |
| 8,879,656 | B2 | 11/2014 | Wang et al. |
| 9,131,414 | B1 | 9/2015 | Dinan |
| 2006/0133529 | A1 | 6/2006 | Lee et al. |
| 2010/0177688 | A1* | 7/2010 | Kishiyama ............ H04J 13/004 370/328 |
| 2013/0156021 | A1 | 6/2013 | Ashikhmin et al. |
| 2014/0098704 | A1 | 4/2014 | Wang |
| 2014/0161018 | A1 | 6/2014 | Chang et al. |
| 2014/0177427 | A1 | 6/2014 | Yiu et al. |
| 2014/0185596 | A1 | 7/2014 | Han et al. |
| 2015/0009951 | A1* | 1/2015 | Josiam ................ H04L 25/0224 370/330 |
| 2015/0049745 | A1 | 2/2015 | Han et al. |
| 2015/0049792 | A1 | 2/2015 | Han et al. |
| 2015/0103737 | A1* | 4/2015 | Balachandran .......... H04B 1/10 370/328 |
| 2015/0103784 | A1 | 4/2015 | Lorca Hernando |
| 2015/0280796 | A1 | 10/2015 | Yen |

FOREIGN PATENT DOCUMENTS

| | | |
|---|---|---|
| CN | 104115021 | 10/2014 |
| CN | 104115459 | 10/2014 |
| TW | 201538002 | 10/2015 |

OTHER PUBLICATIONS

Feng Han, et al., "Time-Reversal Division Multiple Access over Multi-Path Channels," IEEE Transactions on Communications, vol. 60, No. 7, Jul. 2012, pp. 1953-1965.

Beibei Wang, et al., "Green Wireless Communications: A Time-Reversal Paradigm," IEEE Journal on Selected Areas in Communications, vol. 29, No. 8, Sep. 2011, pp. 1698-1710.

Yan Chen, et al., "Time-Reversal Wideband Communications," IEEE Signal Processing Letters, vol. 20, No. 12, Dec. 2013, pp. 1219-1222.

Feng Han, et al., "A Multiuser TRDMA Uplink System with 2D Parallel Interference Cancellation," IEEE Transactions on Communications, vol. 62, No. 3, Mar. 2014, pp. 1011-1022.

Yan Chen, et al., "Time-Reversal Wireless Paradigm for Green Internet of Things: An Overview," IEEE Internet of Things Journal, vol. 1, No. 1, Feb. 2014, pp. 81-98.

Antonios Pitarokoilis, et al., "Uplink Performance of Time-Reversal MRC in Massive MIMO Systems Subject to Phase Noise," IEEE Transactions on Wireless Communications (Impact Factor: 2.5), Jun. 2013, pp. 1-13.

MediaTek Inc., "Technology & Standardization for 5G," 3GPP RAN Workshop on 5G, RWS-150053, Phoenix, AZ, USA, Sep. 17-18, 2015, pp. 1-26.

Carlos Andr'es Viteri-Mera, et al., "Equalized Time Reversal Beamforming for Indoor Wireless Communications," available at: http://arxiv.org/abs/1411.6897v3, Feb. 2015, pp. 1-30.

Haifan Yin, et al., "A Coordinated Approach to Channel Estimation in Large-Scale Multiple-Antenna Systems," IEEE Journal on Selected Areas in Communications, vol. 31, No. 2, Feb. 2013, pp. 264-273.

M. Fink, et al., "Self Focusing in Inhomogeneous Media With "Time Reversal" Acoustic Mirrors," Ultrasonics Symposium, 1989. Proceedings., IEEE 1989, Oct. 3-6, 1989, pp. 681-686.

Christian Dorme, et al., "Focusng in Transbiit-Receive Mode Through Inhomogeneous Media : The Matched Filter Approach," Ultrasonics Symposium, 1992. Proceedings., IEEE 1992, Oct. 20-23, 1992, pp. 629-634.

Daniel Rouseff, et al., "Underwater Acoustic Communication by Passive-Phase Conjugation: Theory and Experimental Results," IEEE Journal of Oceanic Engineering, vol. 26, No. 4, Oct. 2001, pp. 821-831.

Geoffrey F. Edelmann, et al., "An Initial Demonstration of Underwater Acoustic Communication Using Time Reversal," IEEE Journal of Oceanic Engineering, vol. 27, No. 3, Jul. 2002, pp. 602-609.

Carlos A. Viteri-Mera, et al., "Interference-Nulling Time-Reversal Beamforming for mm-Wave Massive MIMO in Multi-User Frequency-Selective Indoor Channels," available at: http://arxiv.org/abs/1506.05143v2, Jun. 2015, pp. 1-26.

\* cited by examiner

METHOD OF PERFORMING UPLINK CHANNEL ESTIMATION AND BASE STATION USING THE SAME

CROSS-REFERENCE TO RELATED APPLICATION

This application claims the priority benefit of Taiwan application serial no. 105102825, filed on Jan. 29, 2016. The entirety of the above-mentioned patent application is hereby incorporated by reference herein and made a part of this specification.

TECHNICAL FIELD

The disclosure generally relates to a method of performing uplink channel estimation and a base station using the same.

BACKGROUND

It is foreseeable that wireless communications in the future may require a large amount of UEs to be served simultaneously. For the scenario of Internet of Things (IoT) for example, the volume of UEs (UE equipment) is expected to grow 10 to 100 times. Although the IoT would offer great challenges of creating a world in which all things around us, known as smart objects, are inter-connected by a wireless communication system, the broad vision of IoT nevertheless has revealed its great potential to improve the qualities of lives. However, a substantial amount of challenges, such as battery power consumptions, interferences among a large amount of UEs, costs of UEs, and so forth, would still need to be addressed.

Presently, communication systems are predominantly broadband communications. However, broadband communications over channels with large delay spreads could be a challenging task due to severe inter-symbol-interferences (ISI). To resolve this challenge, multicarrier modulations such as OFDM and complicated equalization could be needed at the receiver to mitigate any potential ISI. Although the performance might still be well enough by using OFDM, the consequence of using such measure would be high calculation complexities for typical UEs.

The concept of time-reversal division multiple access (TRDMA) was recently introduced as another multiple access scheme for broadband communication systems. In one application of TRDMA downlink system, a base station (BS) may simultaneously transmit data stream to every UE over different multipath channels. To exploit this spatial degrees of freedom of the channels, the BS will first time-reverse the channel impulse response (CR) of each UE's channel as the UE's signature waveform and then embed these signatures into corresponding data streams. When such a combined signal propagates to a target UE through corresponding multipath channels, the combined signal may end up with a "spiky" signal-power spatial distribution focused only at a corresponding UE. In such case, the receiver may only need to make the decision on the spiky signal power time sample. It has been shown that the system performance has both an effective signal-to-interference-plus-noise ratio (SINR) as well as achievable sum rate, and thus TRDMA would appear to be a promising candidate for future broadband wireless communications.

A comparative study between TRDMA and OFDM was made in related works by comparing the two broadband technologies in terms of computational complexities and achievable rates. It has been shown that TR (time-reversal) system may only need some adders at base station; whereas OFDM would need some multipliers because of FFT blocks. Furthermore, computational complexities of a TR system at the receiver side could be negligible since only one-tap detection is performed. This means that the overall computational complexity of TR system would appear much lower than an OFDM system.

However, the key point of TRDMA is that a base station should know the channel impulse response of each UE's channel as the signature waveform in order to time-reverse. This scheme could be very sensitive to channel estimation errors. When a channel estimation error is very large, it may cause a mismatch between a TR and the corresponding channel. Thus, a TRDMA based communication system could be different from the other communication systems since a TRDMA based communication system would require channel state information in time domain rather than frequency domain.

When UEs transmit data to base station, each of the UEs may need to perform the channel estimation. In some IoT scenarios, it should be noted that there could a lot of UEs requiring channel estimations simultaneously. The traditional channel estimation method is that UEs would perform the channel estimations one by one. This means that a UE can not perform a channel estimation as long as there is another UE which is current performing channel estimate. In this way, the UEs must wait for others to finish channel estimations. Thus, the UE will require a lot of time performing channel estimations when the amount of UEs is very large. Further, if the UEs perform channel estimations simultaneously by transmitting training sequences to base station, the training sequence sent by multiple UEs may interfere among one another in the training stage. In other words, one of the most pressing issues currently is the development of an efficient and well channel estimation method for large amount of UEs.

SUMMARY

Accordingly, the disclosure is directed to a method of performing uplink channel estimation and a base station using the same.

According to one of the exemplary embodiments, the disclosure proposes a method of performing uplink channel estimation, which is applicable to a base station serving at least two UEs in a communication system. The at least two UEs are located in at least two beam sectors respectively. The base station comprises a plurality of antennas. The method would include not limited to: determining whether multipath of the at least two UEs passing through a same beam sector; assigning a first training sequence for a first UE of the at least two UEs and assigning a second training sequence for a second UE of the at least two UEs, wherein the first training sequence is orthogonal to the second training sequence in response to the multipath of the at least two UEs passing through the same beam sector; receiving a reference signal, wherein the reference signal is transmitted by the first UE and the second UE according to the first training sequence and the second training sequence; and performing channel estimation for the first UE and the second UE according to the reference signal, the first training sequence and the second training sequence.

According to one of the exemplary embodiments, the disclosure proposes a base station, which is applicable to serve at least two UEs in a communication system. The base station includes a plurality of antennas, a transceiver circuit, a storage circuit, and a processing circuit. The transceiver circuit is configured to transmit and receive wireless signals through the plurality of antennas. The storage circuit stores a plurality of program codes. The processing circuit is coupled to the transceiver circuit and the storage circuit. The processing circuit is configured to access the program codes to perform operations of: obtaining multipath information of the at least two UEs; determining whether multipath of the at least two UEs passing through a same beam sector according to the multipath information of the at least two UEs; assigning a first training sequence for a first UE of the at least two UEs and assigning a second training sequence for a second UE of the at least two UEs, wherein the first training sequence is orthogonal to the second training sequence in response to the multipath of the at least two UEs passing through the same beam sector; receiving a reference signal, wherein the reference signal is transmitted by the first UE and the second UE according to the first training sequence and the second training sequence; and performing channel estimation for the first UE and the second UE according to the reference signal, the first training sequence and the second training sequence.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

DESCRIPTION OF THE EMBODIMENTS

Figure 1:
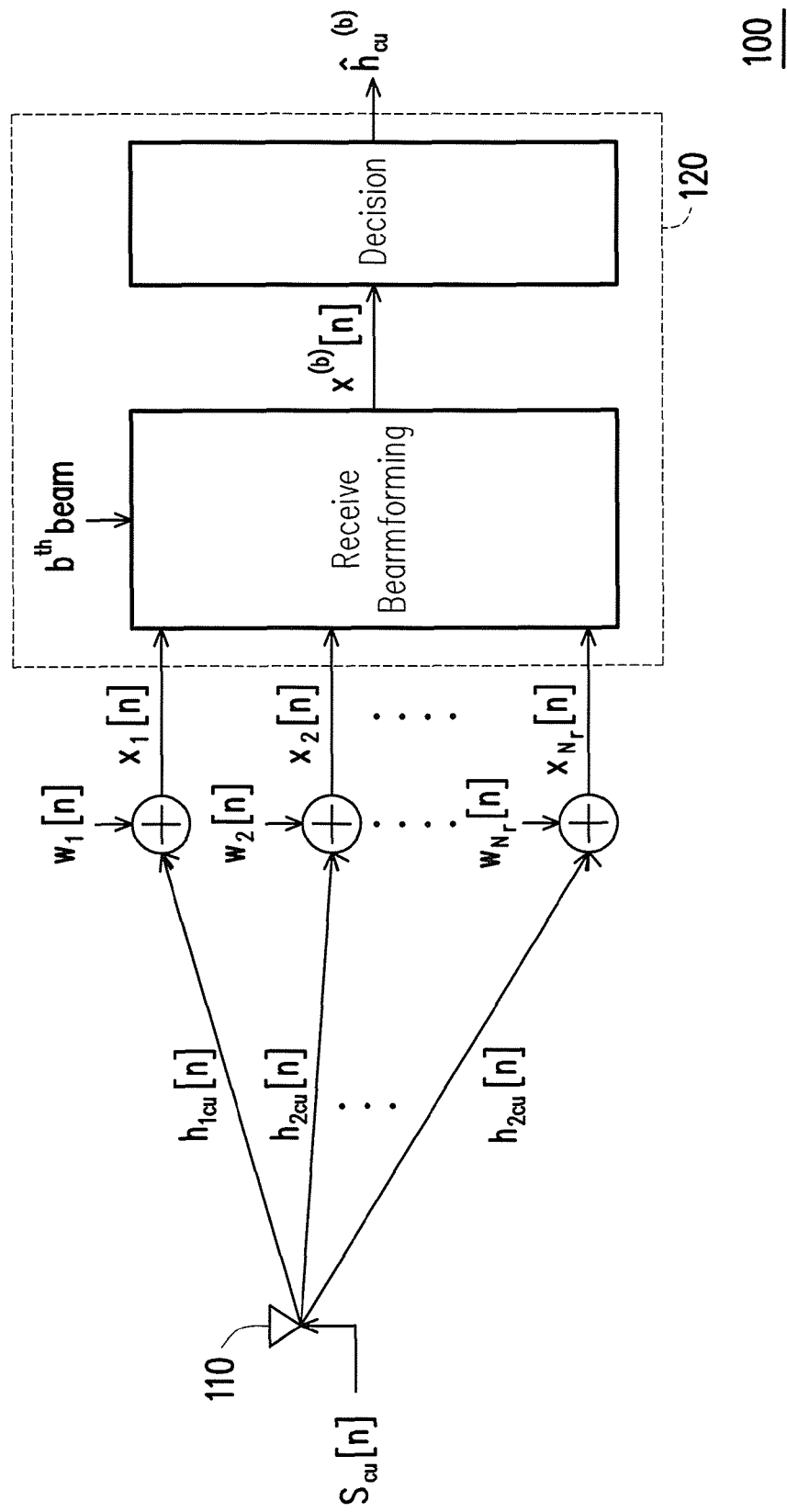
FIG. 1 is a schematic diagram which illustrates a system model for single UE uplink training system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a processing circuit is coupled to a transceiver circuit and a storage circuit" should be interpreted as "the processing circuit is directly connected to the transceiver circuit and the storage circuit" or "the processing circuit is indirectly connected to the transceiver circuit and the storage circuit through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

The disclosure proposes a base station as well as a method by which the base station can detect the spatial degrees of freedom of UEs by receiving beamforming, the base station can appropriately assign training sequence to the UEs in the communication system. As such, the disclosure not only can provide a means for multiple devices to perform channel estimations simultaneously but would also provide a channel estimation technique for a multi-UEs scenario.

FIG. 1 is a schematic diagram which illustrates an overall system model for a single UE uplink training system. Referring to FIG. 1, the single UE uplink training system 100 may include not limited to an uplink single UE 110 and a target base station 120. The received signal $x_m[n]$ of the $m^{th}$ single-input and single-output (SISO) channel at the target base station 120 could be composed of the convolution of the training signal with the channel and the noise, which is expressed as:

$$x_m[n]=(S_{cu}*h_{mcu})[n]+w_m[n], \quad \text{Eq. (1)}$$

wherein the training sequence $S_{cu}$ can be expressed as:

$$S_{cu}=[S_{cu}[0]\ S_{cu}[1]\ \ldots\ S_{cu}[N_p-1]]^T, \quad \text{Eq. (2)}$$

and the channel $h_{mcu}$ can be expressed as:

$$h_{mcu}=[h_{mcu}[0]\ h_{mcu}[1]\ \ldots\ h_{mcu}[L]]^T \quad \text{Eq. (3)}$$

In Eq. (1), $w_m[n]$ is the AWGN signal. It is noted that $w_m[n]$ is assumed to be Gaussian random variables with zero mean and variance of one (but is not limited thereto). In Eq. (2), $S_{cu}[n]$ is the training sequence signal of the $u^{th}$ UE in the $c^{th}$ cell, and it is assumed that the number of training symbols per UE and per frame is $N_p$. In Eq. (3), $h_{mcu}[n]$ is the channel coefficient between the $m^{th}$ antenna and the $u^{th}$ UE in the $c^{th}$ cell, and it is assumed that total length of channel impulse response is L+1.

In the present embodiment, the Eq. (1) also can be changed into the matrix form, as follows:

$$X=S_{cu}H_{cu}+N, \quad \text{Eq. (4)}$$

wherein $S_{cu}$ is a training matrix which is a Toeplitz matrix, $H_{cu}$ is a channel matrix combing all antennas at target base station 120, and N is a noise matrix received at target base station 120. It is assumed that the number of training symbols per UE and per frame is $N_p$ and the total number of antennas of the target base station 120 is $N_r$. Since the first training symbols are influenced by unknown previous symbols, the target base station 120 only receives the last $N_p$ training symbols for channel estimation. The training matrix $S_{cu}$ of dimension $N_p \times (L+1)$ is expressed as:

$$S_{cu} = \begin{bmatrix} S_{cu}[L] & S_{cu}[L-1] & \cdots & S_{cu}[0] \\ S_{cu}[L+1] & S_{cu}[L] & \cdots & S_{cu}[1] \\ \vdots & \cdots & \vdots & \vdots \\ S_{cu}[N_p+L-1] & S_{cu}[N_p+L-2] & \cdots & S_{cu}[N_p-1] \end{bmatrix}_{N_p \times (L+1)}$$

Eq. (5)

the received matrix X of dimension $N_p \times N_r$ at the target base station 120 is expressed as:

$$X = \begin{bmatrix} x_1[L] & x_2[L] & \cdots & x_{N_r}[L] \\ x_1[L+1] & x_2[L+1] & \cdots & x_{N_r}[L+1] \\ \vdots & \cdots & \vdots & \vdots \\ x_1[N_p+L-1] & x_2[N_p+L-1] & \cdots & x_{N_r}[N_p+L-1] \end{bmatrix}_{N_p \times N_r}$$

Eq. (6)

and the channel matrix $H_{cu}$ of dimension $(L+1) \times N_r$ is expressed as:

$$H_{cu} = \begin{bmatrix} h_{1cu}[0] & h_{2cu}[0] & \cdots & h_{N_rcu}[0] \\ h_{1cu}[1] & h_{2cu}[1] & \cdots & h_{N_rcu}[1] \\ \vdots & \cdots & \vdots & \vdots \\ h_{1cu}[L] & h_{2cu}[L] & \cdots & h_{N_rcu}[L] \end{bmatrix}_{(L+1) \times N_r}$$

Eq. (7)

Since there could be a lot of antennas serving per UE in massive multiple-input and multiple-output (MIMO) system, the spatial degrees of freedom may be used to detect the UEs. The UEs can use random access channel to inform the target base station 120 their locations. Therefore, the target base station 120 may, through sounding signal (e.g., random access preamble) detect UE information which includes the UEs' angle of arrivals (AOA), UE's position, and the beam sector in which the target UE stands, but the disclosure is not limited thereto. By using the UE information, the target base station 120 can receive beamforming by timing $e_{cu}^{(b)}$ which is a steering vector of the $u^{th}$ UE in the $c^{th}$ cell in the $b^{th}$ beam sector if UE is in that beam sector. The received matrix X could change into an vector $x^{(b)}$, which is expressed as:

$$x^{(b)} = S_{cu} H_{cu} e_{cu}^{(b)} + n,$$

Eq. (8)

wherein $e_{cu}^{(b)}$ can be expressed as:

$$e_{cu}^{(b)} = \frac{1}{\sqrt{N_r}} \begin{bmatrix} 1 \\ \exp(-j2\pi\Delta\cos(\Omega^{(b)})) \\ \exp(-j2\pi 2\Delta\cos(\Omega^{(b)})) \\ \vdots \\ \exp(-j2\pi(N_r-1)\Delta\cos(\Omega^{(b)})) \end{bmatrix},$$

Eq. (9)

$\Omega^{(b)}$ is the angle of the $b^{th}$ beam sector and n is a noise vector received at the $b^{th}$ beam sector.

According to Eq. (6) and Eq. (8), after receiving beamforming by the target base station 120, the virtual channel between the UE 110 and the target base station 120 can be regarded as an vector $h_{cu}^{(b)}$ which is a SISO virtual channel of the $u^{th}$ UE in the $c^{th}$ cell in the $b^{th}$ beam sector. Hence, the received signal in Eq. (8) would be written as follows:

$$x^{(b)} = S_{cu} H_{cu} e_{cu}^{(b)} + n$$
$$= S_{cu} h_{cu}^{(b)} + n,$$

Eq. (10)

Figure 2:
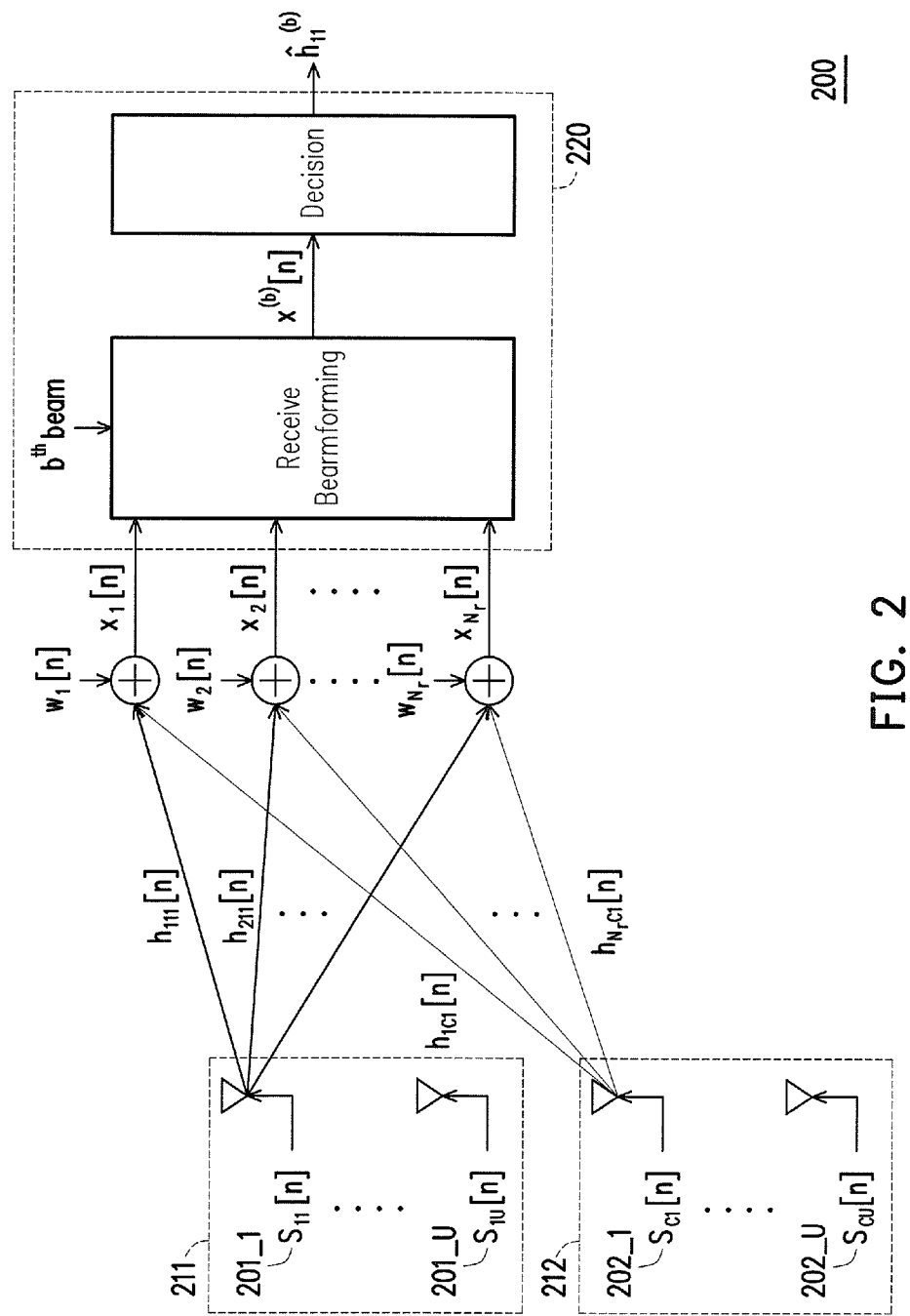
FIG. 2 is a schematic diagram which illustrates a system model for multi-UE and multi-cell uplink training system.

FIG. 2 is a schematic diagram which illustrates a system model for multi-UE and multi-cell uplink training system. Referring to FIG. 2, the multi-UE and multi-cell uplink training system 200 may include not limited to a plurality of UEs (e.g., the UEs 201_1~201_U within the cell 211 and the UEs 202_1~202_U within the cell 212, where U is any positive integer) and a target base station 220. Similar to the single UE uplink training system 100 in FIG. 1, the target base station 220 may detect UE information of the UEs 201_1~201_U and 202_1~202_U, which comprises the UEs' AOA, UE's position and which beam sector does the target UE stand in, but the disclosure is not limited thereto. By using the UE information, the target base station 220 may receive beamforming by timing $e_{cu}^{(b)}$ which is a steering vector of the $u^{th}$ UE in the $c^{th}$ cell in the $b^{th}$ beam sector. Then, according to the Eq. (10), the received signal with beamforming would be written as follows:

$$x^{(b)} = \sum_{c=1}^{C} \sum_{u=1}^{U} S_{cu} H_{cu} e_{cu}^{(b)} + n$$
$$= \sum_{c=1}^{C} \sum_{u=1}^{U} S_{cu} h_{cu}^{(b)} + n.$$

Eq. (11)

In one embodiment, it is assumed that the $1^{st}$ UE in the $1^{st}$ cell is a target UE (e.g., the UE 201_1). The received signal $x^{(b)}$ can be separated into target UE's signal and the interference between pilots sent by other multiple UEs, which is expressed as:

$$x^{(b)} = S_{11} h_{11} + \sum_{\substack{c=1 \\ c,u \neq 1}}^{C} \sum_{u=1}^{U} S_{cu} h_{cu}^{(b)} + n.$$

Eq. (12)

According to Eq. (8) and Eq. (10), the linear LS channel estimation for the single UE uplink training system 100 or the multi-UE and multi-cell uplink training system 200 is given by:

$$\hat{h}_{cu}^{(b)} = [S_{cu}^H S_{cu}]^{-1} S_{cu}^H x^{(b)},$$

Eq. (13)

the correlation matrix of the error of the channel estimation is given by:

$$R_{ee} = E\{(\hat{h}_{cu}^{(b)} - h_{cu}^{(b)})(\hat{h}_{cu}^{(b)} - h_{cu}^{(b)})^H\}.$$

Eq. (14)

Hence, the Mean square error (MSE) of LS channel estimation would be given by:

$$MSE = tr(R_{ee})$$
$$= \sigma_n^2 tr([S_{cu}^H S_{cu}]^{-1}).$$

Eq. (15)

For the purpose to minimize the MSE of LS channel estimation, the disclosure propose to design the training sequence $S_{cu}$ holds the two conditions, as follows:

$$\begin{cases} S_{cu}^2[k] = a^2 = \text{constant}, & \forall k \\ S^H S = \lambda I, & \text{with } \lambda = N_p a \end{cases} \quad \text{Eq. (16)}$$

In the present embodiment, the training sequence $S_{cu}$ may be generated for any length $N_p$ by using a Zadoff-Chu sequence, as shown below:

$$S_M[n] = \begin{cases} \dfrac{1}{\sqrt{N_p}} e^{j\pi M n^2/N_p}, & \text{for } N_p \text{ is even} \\ \dfrac{1}{\sqrt{N_p}} e^{j\pi M n(n+1)/N_p}, & \text{for } N_p \text{ is odd} \end{cases} \quad \text{Eq. (17)}$$

$(M, N_p) = 1,$ where M is a Zadoff-Chu root index, and the value is a natural number greater than zero and needs to be co-prime to $N_p$.

The properties of Zad-off Chu sequence may be described as follows:

$$S_M^H(t_1)S_M(t_2) = \begin{cases} 1, & \text{if } t_1 = t_2 \\ 0, & \text{if } t_1 \neq t_2 \end{cases} \quad t_1, t_2 \text{ is time shift value} \quad \text{Eq. (18)}$$

$$S_{M_1}^H(t_1)S_{M_2}(t_2) = \frac{1}{\sqrt{N_p}}, \text{ if } M_1 \neq M_2,$$

where $S_M(t_1) = [\, S_M[t_1] \quad S_M[t_1+1] \quad \ldots \quad S_M[t_1+N_p-1] \,]^T.$ In the embodiment, it is assumed that the initial time shift value $t_1$ and Zadoff-Chu root index M are chosen to be the training sequence $S_M(t_1)$, which is written into the first rows of the training matrix $S_M(t_1)$. The next row is the one element right shifted version of the previous row, so as to form a toeplitz training matrix $S_M(t_1)$ used in the system model for the single UE uplink training system 100 or the multi-UE and multi-cell uplink training system 200. The training matrix $S^M(t_1)$ may be expressed as:

$$S_M(t_1) = \begin{bmatrix} S_M[t_1+L] & S_M[t_1+L-1] & \ldots & S_M[t_1] \\ S_M[t_1+L+1] & S_M[t_1+L] & \ldots & S_M[t_1+1] \\ \vdots & \ldots & \vdots & \vdots \\ S_M\begin{bmatrix} t_1+N_p+ \\ L-1 \end{bmatrix} & S_M\begin{bmatrix} t_1+N_p+ \\ L-2 \end{bmatrix} & \ldots & S_M\begin{bmatrix} t_1+ \\ N_p-1 \end{bmatrix} \end{bmatrix} \quad \text{Eq. (19)}$$

If there is another training matrix $S_M(t_2)$ and its time shift value $t_2$ is large than $t_1$ for (L+1). Then these two training matrix can satisfy mutually orthogonal property, i.e., $$S_M^H(t_2)S_M(t_1) = 0 \quad \text{Eq. (20)}$$

On the other hand, if these two training matrix using different Zadoff-Chu root indexes $M_1$ and $M_2$, then the training matrix $S_M(t_1)$ and $S_M(t_2)$ will satisfy the equation as follows:

$$S_{M_1}^H(t_1)S_{M_2}(t_2) = \frac{1}{\sqrt{N_p}}, \text{ if } M_1 \neq M_2. \quad \text{Eq. (21)}$$

In the present embodiment, for the purpose to minimize the MSE of LS channel estimation, the disclosure may receive beamforming and use Zadoff-Chu sequence as the training sequence to reduce the interference between pilots sent by multiple UEs. Although beamforming has helped mitigate a part of interference between pilots sent by multiple UEs, and assigning mutually orthogonal and non-orthogonal Zadoff-Chu training sequence for UEs might further reduce more interference between pilots sent by multiple UEs in the training stage from the UEs in the same beam sector. However, it is noted that there is a situation that would result in severe interference between the multiple UEs. Since there are multiple UEs transmit reference signals to the target base station, multipath signals are scattering and would be received by the target base station in different AOA.

Figure 3:
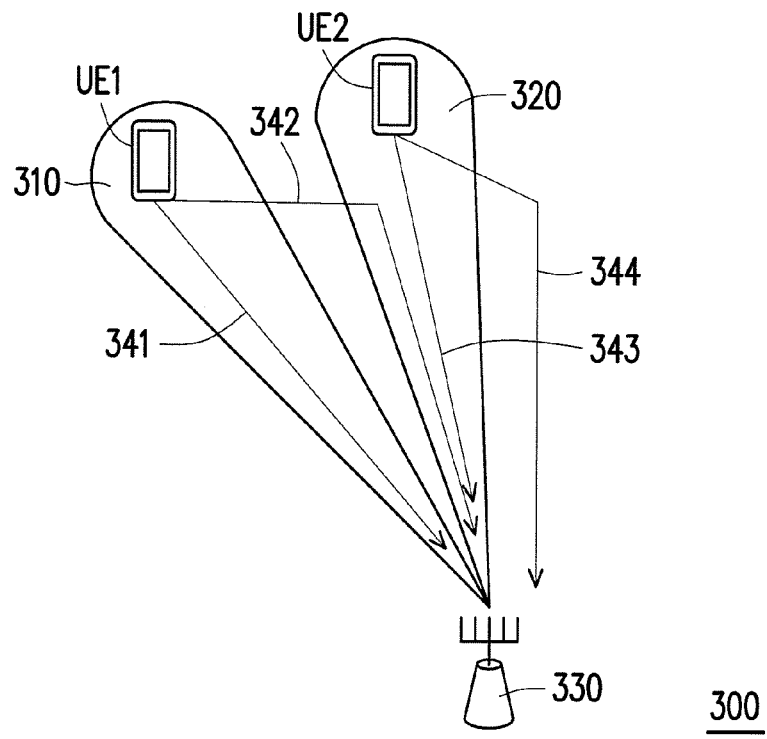
FIG. 3 is a schematic diagram which illustrates that multipath signals are scattering to the same beam sector.

FIG. 3 is a schematic diagram which illustrates that multipath signals are scattering to the same beam sector. Referring to FIG. 3, it shows that the UE 1 and UE 2 stand in the beam sectors 310 and 320, respectively. In the embodiment, the arrow lines are defined as UE's (i.e., the UE 1 and UE 2) multipath (e.g., the channel path 341, 342, 343 and 344). If there are two UEs (i.e., UE1 and UE2) who are using non-orthogonal sequence with each other and their multipath signals go into the same beam sector (i.e., the beam sector 320), it will cause a serious multi-UE interference in the beam sector 320.

Therefore, from the point of view mentioned above, the disclosure proposes a uplink channel estimation method for the base station to mitigate the multi-UE interference from other UEs. Referring to FIG. 3, an uplink transmission system 300 of the present embodiment includes a base station 330 and at least two UEs (e.g., UE1 and UE2). It should be noted that although FIG. 3 merely illustrates the UE1 and UE2 as an example, but the disclosure could be generalized to more UEs. The UE1 and the UE2 are located in the beam sector 310 and the beam sector 320 respectively. In addition, the arrow lines are also defined as UE's (i.e., the UE1 and UE2) uplink multipath (i.e., the channel path 341, 342, 343 and 344).

In the present embodiment, the UE1 and the UE2 may be presented as various implementations, which may (but not limited to) include, for example, a mobile station, an advanced mobile station (AMS), a server, a UE terminal, a notebook computer, a network computer, a workstation, a personal digital assistant (PDA), a phone device, a pager, a camera, a television, a handheld video game device, a wireless sensor, etc.

Further, the base station 330 may be presented as various implementations, which may (but not limited to) include, for example, an eNB, a home eNB (HeNB), an advanced base station (ABS), a base transceiver system (BTS), an access point, a home base station, a relay, a scatterer, a repeater, an intermediate node, an intermediary and/or a satellite-based communication base station.

Figure 4:
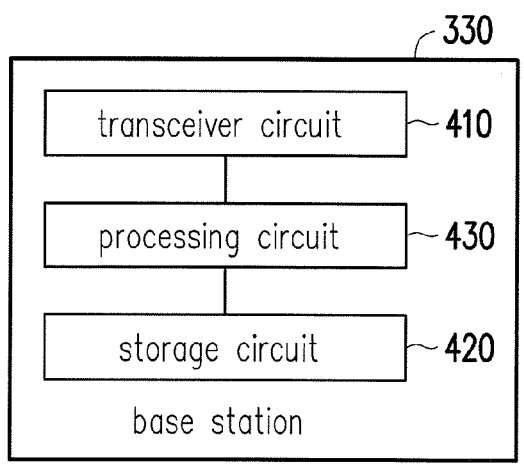
FIG. 4 is a block diagram which illustrates an exemplary base station according to one of the embodiments of the disclosure.

In the present embodiment, the base station 330 may be represented by at least the functional elements as illustrated in FIG. 4. FIG. 4 is a block diagram illustrating the base station 330 according to an embodiment of the disclosure. The base station 330 includes a transceiver circuit 410, a storage circuit 420 and a processing circuit 430. In addition, the base station 330 comprises a plurality of antennas. The transceiver circuit 410 functions as a general network interface card and is configured for message transmitting and receiving through the plurality of antennas with the UE1 and the UE2. The storage circuit 420 is, for example, a memory, a hard disk or other devices for storing data and is configured to store a plurality of program codes or modules. The processing circuit 430 is coupled to the transceiver circuit 410 and the storage circuit 420. The processing circuit 430 is configured to access the program codes stored in the storage circuit 420.

Figure 5:
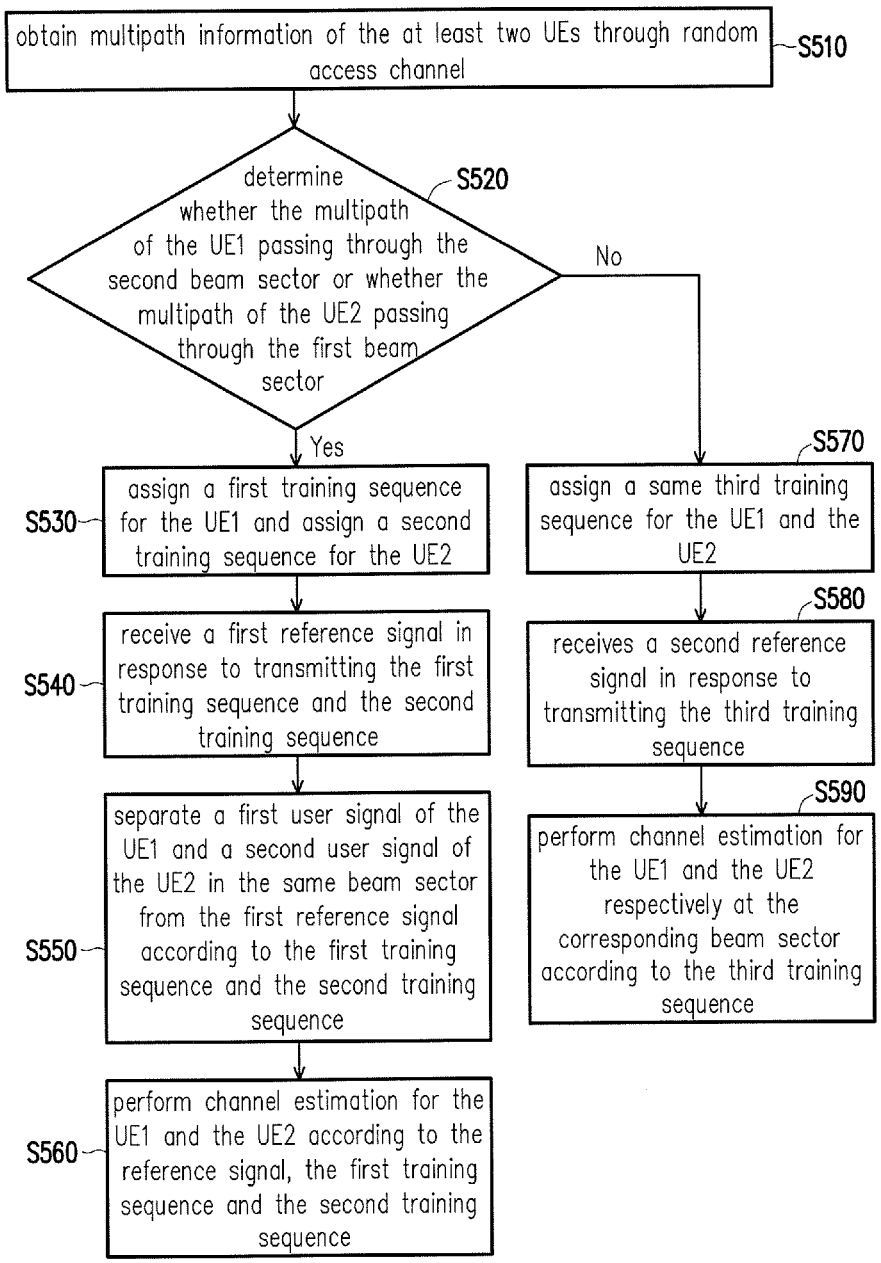
FIG. 5 is a flowchart which illustrates a method of performing uplink channel estimation according to one of the exemplary embodiments of the disclosure.

In the present embodiment, the processing circuit 430 may access the program codes to perform operations of uplink channel estimation. FIG. 5 is a flowchart illustrating a method of performing uplink channel estimation according to an embodiment of the disclosure. Referring to FIG. 3, FIG. 4 and FIG. 5, the method of performing uplink channel estimation of the present embodiment is applied to the uplink transmission system 300 illustrated in FIG. 3, and each step of the method of performing uplink channel estimation of the disclosure will be described below with reference to each element depicted in FIG. 4.

In step S510, the processing circuit 430 may obtain multipath information of the at least two UEs through random access channel, wherein the multipath information comprises a first multipath information corresponding to the UE1 and a second multipath info nation corresponding to the UE2.

In the present embodiment, the processing circuit 430 may obtain multipath information of angle of arrivals (AOA), position, multipath of the at least two UEs and which the at least two beam sectors that the each of the at least two UEs stands in through a random access channel. The spatial degrees of freedom may be used to detect information about the UE1 and the UE2. The UE1 and the UE2 can use random access channel to inform the base station 330 their locations. The base station 330 may through sounding signal (e.g., random access preamble) to detect information about the UE1 and the UE2 comprising the UEs' angle of arrivals, UE's position and which beam sector does the UEs stand in, but the disclosure is not limited thereto. In the present embodiment, the base station 330 may detect that the UE1 and the UE2 are stand in the beam sectors 310 and 320 respectively.

In addition, the base station 330 may further detect the multipath of the UE1 and UE2 through random access channel by doing the MUSIC algorithm, but the disclosure is not limited thereto. The multipath information comprises a first multipath corresponding to the UE1 and a second multipath corresponding to the UE2. Referring to FIG. 3, since the arrow lines are defined as UE's (i.e., the UE1 and the UE2) multipaths, the first multipath shows that the channel path 341 is going into the beam sector 310 and the channel path 342 is going into the beam sector 320. Besides, the second multipath shows that the channel path 343 is going into the beam sector 320 and the channel path 344 is going out of the beam sector 320.

In step S520, the processing circuit 430 may determine whether the first multipath passing through the beam sector 320 or whether the second multipath passing through the beam sector 310 according to the first and the second multipath information. That is, the processing circuit 430 may determine whether the first multipath and the second multipath passing through a same beam sector.

In the present embodiment, the processing circuit 430 may determine whether a first multipath of the UE1 passing through the beam sector 320 that the UE2 is located in or a second multipath of the UE2 passing through the beam sector 310 that the UE1 is located in. Since the channel path 342 of the UE1 is going into the beam sector 320 and the channel path 343 of the UE2 is also going into the beam sector 320, it shows that the first multipath and the second multipath have passed through the same beam sector (i.e., the beam sector 320).

Then, in step S530, the processing circuit 530 may assign a first training sequence for the UE1 and assign a second training sequence for the UE2, wherein the first training sequence is orthogonal to the second training sequence.

In the present embodiment, the base station 330 would assign orthogonal training sequences for those UEs whose multipath would go into same beam sector. Hence, the processing circuit 430 may assign a first training sequence for the UE1 and assign a second training sequence for the UE2, wherein the first training sequence is orthogonal to the second training sequence. Since the properties of Zad-off Chu sequence mentioned in Eq. (18), the first training sequence and the second training sequence are generated by using a Zadoff-Chu-sequence with different cyclic time shift. In other word, it is assumed that the initial time shift value $t_1$ and Zadoff-Chu root index M are chosen to be the first training sequence $S_M(t_1)$ for the UE1, and another time shift value $t_2$ which is large than $t_1$ are chosen to be the second training sequence $S_M(t_2)$ for the UE2. In this way, the first training sequence and the second training sequence can satisfy mutually orthogonal property, i.e., $$S_M^H(t_2)S_M(t_1)=0. \qquad \text{Eq. (22)}$$

In step S540, the processing circuit 530 may receive a first reference signal in response to transmitting the first training sequence and the second training sequence.

In the present embodiment, according to the Eq. (10) which describes the received signal at the base station, the first reference signal of the $u^{th}$ UE in the $b^{th}$ beam sector received by the base station 330 would be also written as follows:

$$\begin{aligned}x^{(b)} &= S_{cu}H_{cu}e_{cu}^{(b)} + n \\ &= S_{cu}h_{cu}^{(b)} + n,\end{aligned} \qquad \text{Eq. (23)}$$

wherein c could be any constant value, $u\in\{1, 2\}$ and $b\in\{310, 320\}$. It is noted that the first reference signal $x^{(b)}$ is transmitted by the UE1 and the UE2 according to the first training sequence and the second training sequence.

In step S550, the processing circuit 530 may separate a first user signal of the UE1 and a second user signal of the UE2 in the same beam sector from the first reference signal according to the first training sequence and the second training sequence, wherein the first reference signal comprises the first user signal and the second user signal.

In the present embodiment, since the base station 330 assigns appropriate the first training sequence (i.e., $S_M(t_1)$) for the UE1 and the second sequence (i.e., $S_M(t_2)$) for the UE2, the first reference signal would be separated according to the training sequences, as follows:

$$\begin{aligned}x^{(b)} &= S_{cu}h_{cu}^{(b)} + n \\ &= S_1 h_1^{(b)} + S_2 h_2^{(b)}\end{aligned} \qquad \text{Eq. (24)}$$

In step S560, the processing circuit 430 may perform channel estimation for the UE1 and the UE2 according to the reference signal, the first training sequence and the second training sequence.

In the present embodiment, since the multi-UE interference have been completely mitigated by assigning mutually orthogonal sequences, the processing circuit 430 may perform channel estimation of the channel path 342 for the UE1 according to the first training sequence and the first user signal (i.e., the separated signal from the Eq. (24)), and perform channel estimation of the channel path 343 for the UE2 according to the second training sequence and the second user signal (i.e., the separated signal from the Eq. (24)) in the same beam sector 320. Further, the processing circuit 430 may perform channel estimation of the channel path 341 for the UE1 according to the first training sequence and the received signal in the beam sector 310, and perform channel estimation of the channel path 344 for the UE2 according to the second training sequence and the received signal in other beam sector. Finally, the MSE of the channel estimation could be decreased.

On the other hand, please back to the step S520, if the first multipath does not pass through the beam sector 320 and the second multipath does not pass through the beam sector 310 (not shown), the base station 330 would assign a same third training sequence for the UE1 and the UE2 in the step S570. In other embodiment, the base station 330 may also assign a fourth training sequence for the UE1 and assigning a fifth training sequence for the UE2, wherein the fourth training sequence is non-orthogonal to the fifth training sequence, but the disclosure is not limited thereof. In the presented embodiment, it uses the same third training sequence for the UE1 and the UE2 to illustrate the disclosure, but the disclosure is not limited thereto.

Since the first multipath only pass through the beam sector 310 and the second multipath only pass through the beam sector 320, it will not cause a serious multi-UE interference in the beam sector 310 or 320 when the processing circuit 430 receives a second reference signal in response to transmitting the third training sequence in the step S580. The reason is that the second reference signal comprises a third user signal of the UE1 in the first beam sector and a fourth user signal of the UE2 in the second beam sector. Therefore, the processing circuit 430 may perform channel estimation for the UE1 and the UE2 respectively at the corresponding beam sector according to the third training sequence in the step S590. In other words, the processing circuit 430 may perform channel estimation for the UE1 according to the third training sequence and the third user signal in the beam sector 310, and perform channel estimation for the UE2 according to the third training sequence and the fourth user signal in the beam sector 320 respectively.

Figure 6:
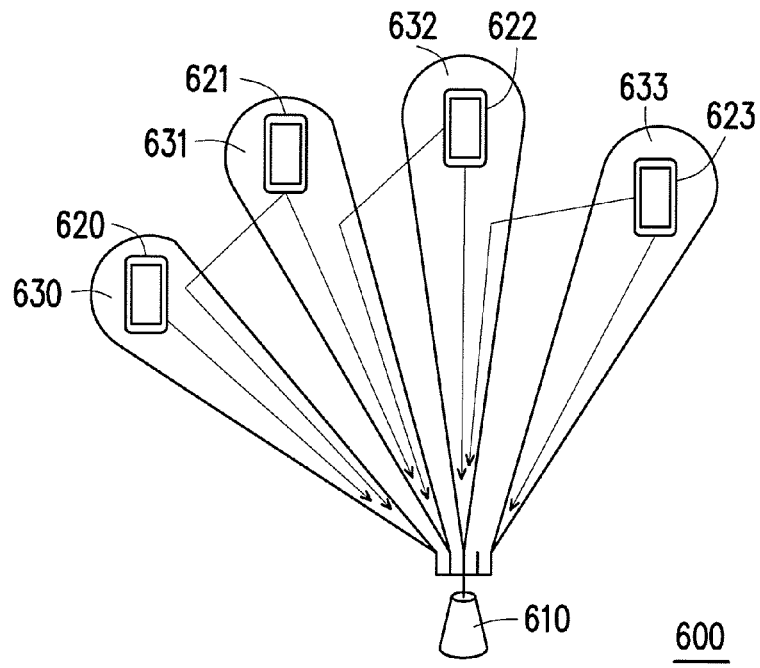
FIG. 6 is a schematic diagram illustrating another uplink transmission system according to an embodiment of the disclosure.

FIG. 6 is a schematic diagram illustrating another uplink transmission system according to an embodiment of the disclosure. Referring to FIG. 6, an uplink transmission system 600 of the present embodiment includes a base station 610 and a plurality of UEs (i.e., the UEs 620, 621, 622 and 623). In addition, the arrow lines are also defined as user's (i.e., UEs 620, 621, 622 and 623) multipath.

In the present embodiment, the base station 610 would assign orthogonal training sequences for those UEs whose multipath would go into same beam sector. If the multipaths of two UEs are not go into the same beam sector, then the two UEs could be assigned the same training sequence or non-orthogonal sequence for them. Similarly, the spatial degrees of freedom may be used to detect the UEs. The base station 610 may through sounding signal (e.g., random access preamble) to detect UE information comprising the UEs' angle of arrivals, UE's position and which beam sector does the UEs stand in, but the disclosure is not limited thereto. In the present embodiment, the base station 610 may detect that the UEs 620, 621, 622 and 623 are stand in the beam sectors 630, 631, 632 and 633 respectively.

In addition, the base station 610 may further detect the multipaths of the UEs 620, 621, 622 and 623 by doing the MUSIC algorithm, but the disclosure is not limited thereto. In the present embodiment, it is defined matrix $T_{(B \times K)}$ is the information of the angle-of-arrival of UE's signal multipath, which may be expressed as:

$$T_{(B \times K)} = \begin{bmatrix} t_{11} & t_{12} & \cdots & t_{1K} \\ t_{21} & t_{22} & \cdots & t_{2K} \\ \vdots & \vdots & & \vdots \\ t_{B1} & t_{B2} & \cdots & t_{BK} \end{bmatrix}, \quad \text{Eq. (25)}$$

where B is the total number of beam sector, K is the total number of UEs and $$t_{bk} = \begin{cases} 1, & \text{if } k^{th} \text{ user's path go into } b^{th} \text{ beam sector} \\ 0, & \text{otherwise} \end{cases}.$$

In the embodiment, since there are four UEs (i.e., the UEs 620, 621, 622 and 623) standing in four beam sectors (i.e., the beam sectors 630, 631, 632 and 633) respectively, the matrix $T_{(4 \times 4)}$ for the UEs 620, 621, 622 and 623's channel path go into the different beam sectors 630, 631, 632 and 633 may be expressed as:

$$T_{(4 \times 4)} = \begin{bmatrix} t_{620} & t_{621} & t_{622} & t_{623} \end{bmatrix} = \begin{bmatrix} 1 & 1 & 0 & 0 \\ 0 & 1 & 1 & 0 \\ 0 & 0 & 1 & 1 \\ 0 & 0 & 0 & 1 \end{bmatrix}, \quad \text{Eq. (26)}$$

where the UE 620's channel path going into the beam sector 630 may be expressed as $$t_{620} = \begin{bmatrix} 1 \\ 0 \\ 0 \\ 0 \end{bmatrix},$$

the UE 621's channel paths going into the beam sector 630 and 631 may be expressed as $$t_{621} = \begin{bmatrix} 1 \\ 1 \\ 0 \\ 0 \end{bmatrix},$$

the UE 622's channel paths going into the beam sector 631 and 632 may be expressed as $$t_{622} = \begin{bmatrix} 0 \\ 1 \\ 1 \\ 0 \end{bmatrix},$$

and the UE 623's channel path going into the beam sector 632 and 633 may be expressed as $$t_{623} = \begin{bmatrix} 0 \\ 0 \\ 1 \\ 1 \end{bmatrix}.$$

After obtaining the multipaths information (i.e., the matrix $T_{(4 \times 4)}$) of the UEs 620, 621, 622 and 623, the base station 610 partitions the UEs 620, 621, 622 and 623 into several mutually exclusive sets based on multipath of the UEs 620, 621, 622 and 623. Since the intersection of $t_{620}$ with $t_{622}$ is the empty set, the UEs 620 and 622 may be grouped into the first set. On the other hand, since the intersection of $t_{621}$ with $t_{623}$ is the empty set, the UEs 621 and 623 may be grouped into the second set. And the first set and the second set are mutually exclusive.

In other embodiment, if there is another UE 624 (which is not shown) entering to the uplink transmission system 600, the base station 610 would further pick up the UE 624 that has not been associated with any one of the first set and the second set to detect multipath information of the UE 624 through random access channel. The base station 610 may determines whether multipath of the UE 624 go into the same beam sectors with all other the plurality of UEs (i.e., the UEs 620, 621, 622 and 623) in the first set or the second set further according to the multipath information of the UE 624. If no, the base station 610 may associate the UE 624 to the first set or the second set in which all other the plurality of UEs do not have the same beam sectors with the UE 624.

In one embodiment, it is assumed that the multipath of the UE 624 only goes into the beam sector 633. Thus, the multipath of the UE 624 may be expressed as $$t_{624} = \begin{bmatrix} 0 \\ 0 \\ 0 \\ 1 \end{bmatrix}.$$

Since the intersection of $t_{624}$ with $t_{623}$ is not the empty set, it shows that the multipath signals of the UE 624 go into the same beam sectors with the UE 623. However, since both the intersection of $t_{624}$ with $t_{620}$ or $t_{622}$ is the empty set, the multipath signals of the UE 624 do not go into the same beam sectors with the UEs 620 or 622 in the first set. As a result, the base station 610 may associate the UE 624 to the first set in which the UEs 620 or 622 do not have the same beam sectors with the UE 624.

On the other hand, if the multipath signals of the UE 624 go into the same beam sectors with all other the plurality of UEs (i.e., the UEs 620, 621, 622 and 623) in the first set and the second set, the base station 610 needs to create an empty set and assign the UE 624 to this empty set.

In one embodiment, it is assumed that the multipaths of the UE 624 go into the beam sectors 630 and 633. Thus, the multipaths of the UE 624 may be expressed as $$t_{624} = \begin{bmatrix} 1 \\ 0 \\ 0 \\ 1 \end{bmatrix}.$$

Since the multipath signals of the UE 624 go into the same beam sectors with the UEs 620 and 623, thus neither the intersection of $t_{624}$ with $t_{620}$ nor $t_{623}$ is the empty set. For the purpose of mitigating the multi-UE interference for the UE 624 with the UEs 620 and 623, the base station 610 needs to create an empty set, e.g., the third set, and assign the UE 624 to this empty set.

Then, referring to the FIG. 6, the base station 610 may assign the training sequence to the UEs 620, 621, 622 and 623 based on the sets that the UEs belong to, wherein the training sequences in the different set are orthogonal and the training sequences in the same set are the same or non-orthogonal with each other. Since the properties of Zad-off Chu sequence mentioned in Eq. (18), the base station 610 could assign Zad-off Chu sequence with different cyclic time shift for the first set and the second set respectively. In other word, it is assumed that the initial time shift value $t_1$ and Zadoff-Chu root index M are chosen to be the training sequence $S_M(t_1)$ for the UEs 620 and 622 in the first set, and another time shift value $t_2$ which is large than $t_1$ are chosen to be the training sequence $S_M(t_2)$ for the UEs 621 and 623 in the second set. Hence, these two training sequences also can satisfy mutually orthogonal property, i.e., $$S_M^H(t_2) S_M(t_1) = 0. \qquad \text{Eq. (27)}$$

In the mean time, since the UE 620's channel path goes into the beam sector 630 and the UE 622's channel paths go into the beam sector 631 and 632, the multipath signals of the UEs 620 and 622 would not interfere to each other. Hence, the UEs 620 and 622 in the first set may use the same training sequence $S_M(t_1)$. Similar to the UEs 620 and 622, the UEs 621 and 623 in the second set may use the same training sequence $S_M(t_2)$ without interfering to each other. But it should be noted that using Zad-off Chu sequence to generate the training sequence is merely exemplary and should not be construed as limitations to the disclosure.

As such, since the base station 610 knows the corresponding beam sector of the UE's (i.e., the UEs 620, 621, 622 and 623) multipath signal (i.e., the matrix $T_{(4 \times 4)}$). The base station 610 could assign appropriate training sequences for the UEs 620, 621, 622 and 623, so as to decrease multi-UE interference between the UEs 620, 621, 622 and 623.

Next, according to the Eq. (10) which describes the received signal at the base station 610, the reference signals of the $u^{th}$ UE in the $b^{th}$ beam sector received by the base station 610 would be also written as follows:

$$\begin{aligned} x^{(b)} &= S_{cu} H_{cu} e_{cu}^{(b)} + n \\ &= S_{cu} h_{cu}^{(b)} + n, \end{aligned} \qquad \text{Eq. (28)}$$

wherein c could be any constant value, $u \in \{620, 621, 622, 623\}$ and $b \in \{630, 631, 632, 633\}$.

Since the base station 610 assign appropriate training sequences for the UEs 620, 621, 622 and 623 (i.e., the UEs 620 and 622 in the first set may use the same training sequence $S_M(t_1)$, while the UEs 621 and 623 in the second set may use the same training sequence $S_M(t_2)$), the reference signals would be separated according to the training sequences assigned to ones of the plurality of UEs that share the beam sector, as follows:

$$x^{(b)} = S_{cu}h_{cu}^{(b)} + n$$

$$= S_{620}h_{620}^{(b)} + S_{622}h_{622}^{(b)} + S_{621}h_{621}^{(b)} + S_{623}h_{623}^{(b)}.$$

Eq. (29)

Finally, since the multi-UE interference which is sent by the UEs who is in target UE's (e.g., the UE 620) beam sector have been completely mitigated by assigning mutually orthogonal sequences, if the scale of receive antenna for the base station 610 is large enough, then the interference between pilots sent from the UEs who do not go into beam sector would be decreased, as follows:

$$\|S_{620}h_{620}^{(b)}\|_2 >> \|S_{622}h_{622}^{(b)}\|_2.$$

Eq. (30)

As a result, the MSE of the channel estimation could be decreased.

Figure 7:
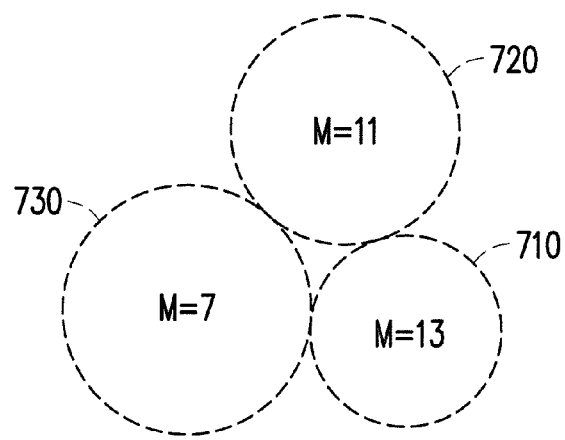
FIG. 7 is a schematic diagram which illustrates a sequence assignment for difference cells according to one of the exemplary embodiments of the disclosure.

In some other embodiment, the base station may further assign different root of the Zadoff-Chu sequences to the UE based on cells that the UE belongs to. According to the properties of Zad-off Chu sequence mentioned in Eq. (18), the base station could assign different roots M of Zadoff-Chu training sequences for UE in other cells. It means that every cell has its own roots M of Zadoff-Chu training sequence. FIG. 7 is a schematic diagram illustrating a sequence assignment for difference cells according to an embodiment of the disclosure. Referring to FIG. 7, it shows that the roots M of Zadoff-Chu training sequence for the cells 710, 720 and 730 are 13, 11 and 7, respectively. From Eq. (18), since the correlation between two different roots of Zadoff-Chu training sequences is smaller than the same training sequences, this property could also help mitigating the interference.

In this way, the base station may separate UE signals in an beam sector according to the training sequences assigned to ones of the plurality of UEs that share the beam sector. According to the Eq. (10), the received signal $x^{(b)}$ at the base station can be separated into target UE's signal and the interference between reference signals sent by other multiple UEs, which is expressed as:

$$x^{(b)} = S_{11}h_{11}^{(b)} + \sum_{c=1}^{C}\sum_{\substack{u=1 \\ c,u \neq 1}}^{U} S_{cu}h_{cu}^{(b)} + n.$$

Eq. (31)

Further, the received signal $x^{(b)}$ at the base station can be separated into the following three parts, which is expressed as:

$$x^{(b)} = S_{11}h_{11}^{(b)} + S_{12}h_{12}^{(b)} + \ldots + S_{1u}h_{1u}^{(b)} +$$
$$S_{1u'}h_{1u'}^{(b)} + \ldots + S_{1U}h_{1U}^{(b)} +$$
$$S_{cu}h_{cu}^{(b)} + \ldots + S_{CU}h_{CU}^{(b)} + n.$$

Eq. (32)

In the first part, the signals $S_{12}h_{12}^{(b)} + \ldots + S_{1u}h_{1u}^{(b)}$ go in to the same beam sector with the signal $S_{11}h_{11}^{(b)}$, thus any one of the training sequences $S_{12}, S_{13}, \ldots$ and $S_{1u}$ is assigned orthogonal with the training sequence $S_{11}$. The signals $S_{1u'}h_{1u'}^{(b)} + \ldots + S_{1U}h_{1U}^{(b)}$ go in to the different beam sector with the signal $S_{11}h_{11}^{(b)}$, thus any one of the training sequence $S_{12}, S_{13}, \ldots$ and $S_{1u}$ is assigned the same or non-orthogonal with the training sequence $S_{11}$. And the signals $S_{cu}h_{cu}^{(b)} + \ldots + S_{CU}h_{CU}^{(b)}$ go in to the different cell with the signal $S_{11}h_{11}^{(b)}$, thus any one of the training sequence $S_{cu}, \ldots$ and $S_{CU}$ is assigned different root of Zadoff-Chu training sequences with the training sequence $S_{11}$. Similarly, if the scale of receive antenna is large enough, then the interference between pilots sent from the UEs who do not go into beam sector would be decreased, as follows:

$$\|S_{11}h_{11}^{(b)}\|_2 >> \|S_{1u}h_{1u}^{(b)} + \ldots S_{1U}h_{1U}^{(b)}\|_2.$$

Eq. (33)

Since the mutually orthogonal sequences are assigned appropriately, the multiple UE interference could be completely mitigated. As a result, the MSE of the channel estimation could be decreased.

Figure 8:
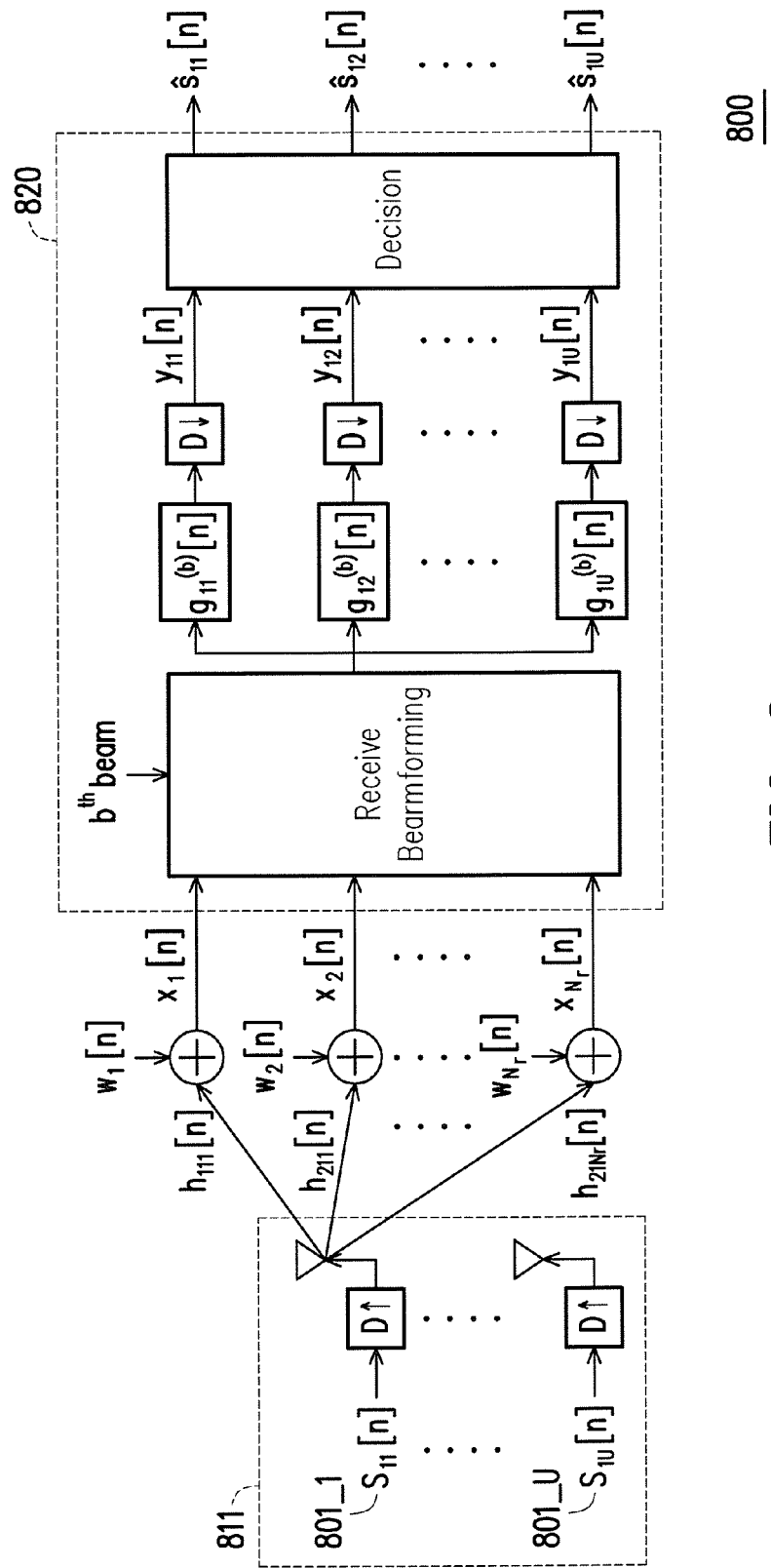
FIG. 8 is a schematic diagram which illustrates a system model for an uplink TRDMA transmission system.

In another embodiment, the uplink channel estimation method in FIG. 4 may be utilized in an uplink TRDMA transmission system. FIG. 8 is a schematic diagram illustrating a system model for an uplink TRDMA transmission system. Referring to FIG. 8, the uplink TRDMA transmission system 800 includes a plurality of UEs (e.g., the UEs 801_1~801_U within a cell 811, where U is any positive integer) and a target base station 820.

In the present embodiment, it is assumed that the $1^{st}$ UE in the $1^{st}$ cell (i.e., the UE 801_1) is a target UE, and $g_{11}^{(b)}$ is the time-reversed signature waveform of the $1^{st}$ UE in the $1^{st}$ cell. Hence, the signal $y_{11}[n]$ is expressed as:

$$y_{11}[n] = \sum_{u=1}^{U} \left(g_{11}^{(b)} * h_{1u}^{(b)} * s_{1u}^{[D]}\right)[n] + \left(g_{11}^{(b)} * w\right)[n],$$

Eq. (34)

where $g_{11}^{(b)}$ is the target UE's time-reversed signature waveform of the channel model, which is given by:

$$g_{11}^{(b)}[n] = \hat{h}_{11}^{(b)}[L-n] \bigg/ \sqrt{\sum_{l=0}^{L} \left|\hat{h}_{11}^{(b)}[l]\right|^2},$$

Eq. (35)

where $\hat{h}_{11}^{(b)}[l]$ is the estimated channel of the $1^{st}$ UE in the $1^{st}$ cell after base station 820 finished the uplink training. It is noted that it can use the uplink channel estimation method in FIG. 4 to obtain the estimated channel. And $s_{1u}^{[D]}$ is the BPSK modulation transmission symbols of the $u^{st}$ UE in the $1^{st}$ cell and up-sampled by a factor D, which is given by:

$$s_{1u}^{[D]}[n] = \begin{cases} s_{1u}[n/D], & \text{if } n \bmod D = 0 \\ 0, & \text{if } n \bmod D \neq 0 \end{cases},$$

Eq. (36)

In the embodiment, the convolution of the target UE's channel and its time-reversed signature waveform will end up with a "spiky" signal-power spatial distribution at the middle of the time sample. As such, the base station 820 only detects on the time sample and makes decision for target UE's symbols (e.g., $\hat{s}_{11}[n]$, as shown in FIG. 8). Therefore, it only needs an one-tap decision per symbol, the complexity of the receiver of the base station 820 in the uplink TRDMA transmission system 800 is very low comparing to the OFDM system.

Furthermore, the signal $y_{11}[n]$ can be separated into signal, inter-symbol interference (ISI), and inter-UE interference (IUI) term, which is given by:

$$y_{11}[n] = \left(g_{11}^{(b)} * h_{11}^{(b)}\right)[L]s_{1u}[n - L/D] + \quad \text{(Signal)}$$

Eq. (37)

-continued $$\sum_{\substack{l=0 \\ l \neq L/D}}^{2L/D} (g_{11}^{(b)} * h_{11}^{(b)})[Dl]s_{1u}[n-l] + \quad (ISI)$$

$$\sum_{u=2}^{U} \sum_{l=0}^{2L/D} (g_{11}^{(b)} * h_{1u}^{(b)})[Dl]s_{1u}[n-l] + \quad (IUI)$$

$$(g_{11}^{(b)} * w)[n],$$

Figure 9:
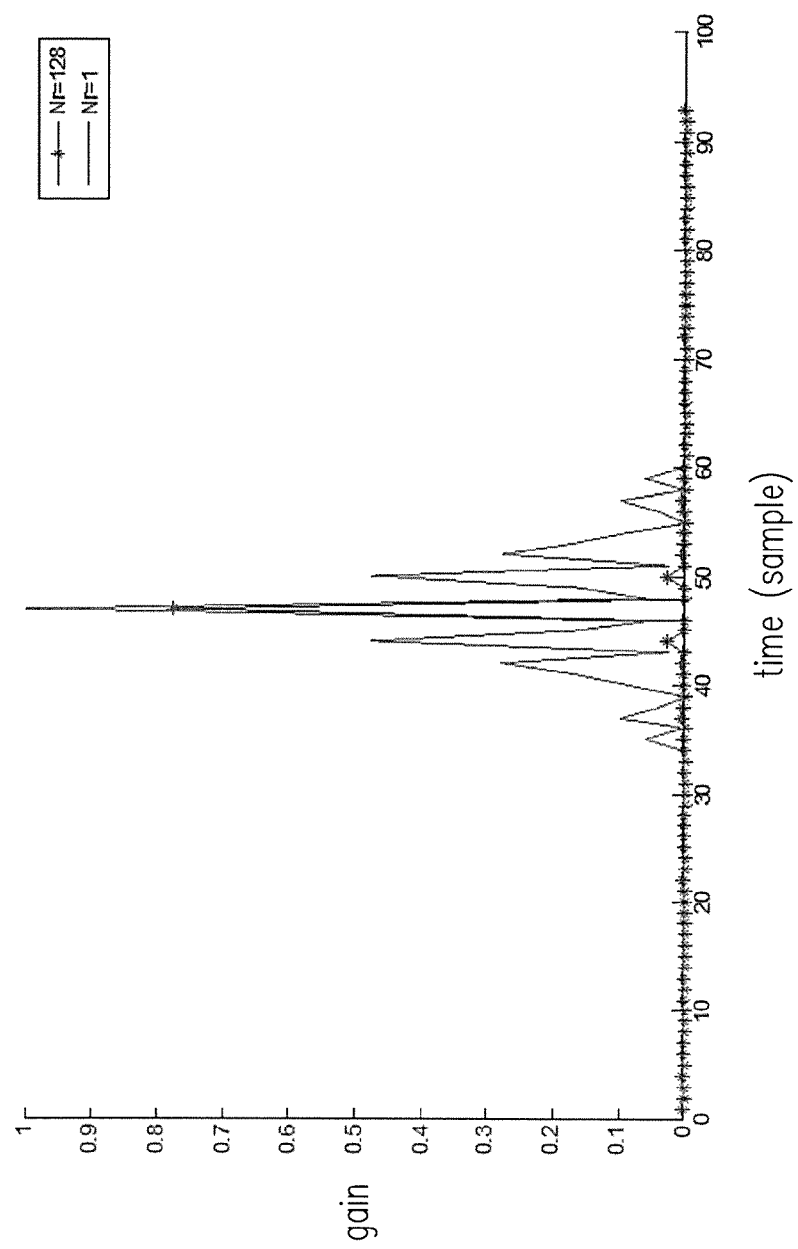
FIG. 9 is a schematic diagram which illustrates convolution results of the channel and time-reverse waveform of the uplink TRDMA transmission system in FIG. 8.

If the scale of antenna at the base station 820 is large, receive beamforming could reduce the multipath come from other direction, let the $g_{11}^{(b)} * h_{11}^{(b)}$ term more "spiky". FIG. 9 is a schematic diagram illustrating convolution results of the channel and time-reverse (TR) waveform of the uplink TRDMA transmission system in FIG. 8. Referring to FIG. 9, it is assumed that the channel order L=46. Besides, "$N_t$=128" exemplarily shows the total number of antennas of the target base station 820 and "$N_r$=1" exemplarily shows only an single antennas of the target base station 820. The desired signal power gain is the value at the middle of the time sample. It shows that the value on the other time samples will become smaller when the number of receive antenna become large. Since ISI will be generated by the value on the other time samples, the ISI and IUI would be mitigated by using a large scale of antennas. As a result, the base station 820 may increase the spectral efficiency without raising D to trade-off with data rate.

In summary, in the method of performing uplink channel estimation and a base station using the same proposed by the embodiments of the disclosure, the base station detect the spatial degrees of freedom of UEs by receiving beamforming, which not only can obtain angle of arrivals but also multipaths of the UEs. As such, the base station could assign orthogonal training sequence for those UEs whose multipath would go into same beam sector to mitigate multi-UE interference among the beam sector, where the training sequences are Zadoff-Chu-sequence with different cyclic time shifts. As a result, through the mechanism of assigning appropriately training sequences, the method proposed by the disclosure not only enables UEs to do the channel estimation simultaneously but also provide well channel estimation since the multi-UE interference is mitigated. In addition, the disclosure further can use large scale antennas at base station to increase the spectral efficiency.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method of performing uplink channel estimation, applicable to a base station serving at least two user equipments (UEs) in a communication system, wherein the at least two UEs are located in at least two beam sectors respectively and the base station comprises a plurality of antennas, the method comprising:
   determining whether multipath of the at least two UEs passing through a same beam sector;
   assigning a first training sequence for a first UE of the at least two UEs and assigning a second training sequence for a second UE of the at least two UEs, wherein the first training sequence is orthogonal to the second training sequence in response to the multipath of the at least two UEs passing through the same beam sector;
   receiving a reference signal, wherein the reference signal is transmitted by the first UE and the second UE according to the first training sequence and the second training sequence; and
   performing channel estimation for the first UE and the second UE according to the reference signal, the first training sequence and the second training sequence.

2. The method according to claim 1, wherein the step of determining whether multipath of the at least two UEs passing through the same beam sector further comprising:
   determining whether multipath of the first UE passing through a second beam sector that the second UE is located in or multipath of the second UE passing through a first beam sector that the first UE is located in.

3. The method according to claim 1, wherein in response to the multipath of the at least two UEs passing through the same beam sector, before the step of performing channel estimation for the first UE and the second UE according to the first training sequence and the second training sequence, the method further comprising:
   separating a first user signal of the first UE and a second user signal of the second UE in the same beam sector from the reference signal according to the first training sequence and the second training sequence, wherein the reference signal comprises the first user signal and the second user signal.

4. The method according to claim 1, wherein before the step of determining whether multipath of the at least two UEs passing through the same beam sector, the method further comprising:
   obtaining user information of angle of arrivals (AOA), position, multipath information of the at least two UEs and which the at least two beam sectors that the each of the at least two UEs stands in through a random access channel.

5. The method according to claim 1, wherein the first training sequence and the second training sequence are generated by using a Zadoff-Chu-sequence with different cyclic time shift.

6. The method according to claim 1, wherein in response to the multipath of the at least two UEs not passing through the same beam sector, the first training sequence is assigned to non-orthogonal or the same with the second training sequence.

7. The method according to claim 1, wherein the at least two UEs further comprising a third UE, the method comprising:
   determining whether multipath of the third UE passing through the at least two beam sectors; and
   assigning the first training sequence or the second training sequence for the third UE in response to the multipath of the third UE not passing through the at least two beam sectors.

8. The method according to claim 7, wherein the method further comprising:
   assigning the first training sequence for the third UE in response to the multipath of the third UE passing through a second beam sector that the second UE is located in but not passing through a first beam sector that the first UE is located in; and
   assigning the second training sequence for the third UE in response to the multipath of the third UE passing through the first beam sector that the first UE is located in but not passing through the second beam sector that the second UE is located in.

9. The method according to claim 7, wherein the method further comprising:
assigning a third training sequence for the third UE in response to the multipath of the third UE passing through the same beam sector, wherein the third training sequence is orthogonal to the first training sequence and the second training sequence.

10. The method according to claim 7, wherein the third UE is located in a different cell with the first UE and the second UE, the method further comprising:
assigning a fourth training sequence for the third UE, wherein the fourth training sequence is generated by using a Zadoff-Chu-sequence with different root to the first training sequence and the second training sequence.

11. The method according to claim 1, wherein the communication system is a time-reversal division multiple access (TRDMA) system.

12. A base station, applicable to serve at least two user equipments (UEs) in a communication system, wherein the at least two UEs are located in at least two beam sectors respectively, the base station comprising:
a plurality of antennas;
a transceiver circuit, configured to transmit and receive wireless signals through the plurality of antennas;
a storage circuit, storing a plurality of program codes; and
a processing circuit, coupled to the transceiver circuit and the storage circuit and configured to access the program codes to perform operations of:
obtaining multipath information of the at least two UEs;
determining whether multipath of the at least two UEs passing through a same beam sector according to the multipath information of the at least two UEs;
assigning a first training sequence for a first UE of the at least two UEs and assigning a second training sequence for a second UE of the at least two UEs, wherein the first training sequence is orthogonal to the second training sequence in response to the multipath of the at least two UEs passing through the same beam sector;
receiving a reference signal, wherein the reference signal is transmitted by the first UE and the second UE according to the first training sequence and the second training sequence; and
performing channel estimation for the first UE and the second UE according to the reference signal, the first training sequence and the second training sequence.

13. The base station according to claim 12, wherein the processing circuit further access the program codes to perform an operation of:
determining whether multipath of the first UE passing through a second beam sector that the second UE is located in or multipath of the second UE passing through a first beam sector that the first UE is located in.

14. The base station according to claim 12, in response to the multipath of the at least two UEs passing through the same beam sector, the processing circuit further access the program codes to perform an operation of:
separating a first user signal of the first UE and a second user signal of the second UE in the same beam sector from the reference signal according to the first training sequence and the second training sequence, wherein the reference signal comprises the first user signal and the second user signal.

15. The base station according to claim 12, wherein the processing circuit further access the program codes to perform an operation of:
obtaining user information of angle of arrivals (AOA), position, and which the at least two beam sectors that the each of the at least two UEs stands in through a random access channel.

16. The base station according to claim 12, wherein the first training sequence and the second training sequence are generated by using a Zadoff-Chu-sequence with different cyclic time shift.

17. The base station according to claim 12, wherein in response to the multipath of the at least two UEs not passing through the same beam sector, the first training sequence is assigned to non-orthogonal or the same with the second training sequence.

18. The base station according to claim 12, wherein the at least two UEs further comprising a third UE, the processing circuit further access the program codes to perform an operation of:
obtaining multipath information of the third UE;
determining whether multipath of the third UE passing through the at least two beam sectors according to the multipath information of the third UE; and
assigning the first training sequence or the second training sequence for the third UE in response to the multipath of the third UE not passing through the at least two beam sectors.

19. The base station according to claim 18, wherein the processing circuit further access the program codes to perform an operation of:
assigning the first training sequence for the third UE in response to the multipath of the third UE passing through a second beam sector that the second UE is located in but not passing through a first beam sector that the first UE is located in; and
assigning the second training sequence for the third UE in response to the multipath of the third UE passing through the first beam sector that the first UE is located in but not passing through the second beam sector that the second UE is located in.

20. The base station according to claim 18, wherein the processing circuit further access the program codes to perform an operation of:
assigning a third training sequence for the third UE in response to the multipath of the third UE passing through the same beam sector, wherein the third training sequence is orthogonal to the first training sequence and the second training sequence.

21. The base station according to claim 18, wherein the third UE is located in a different cell with the first UE and the second UE, the processing circuit further access the program codes to perform an operation of:
assigning a fourth training sequence for the third UE, wherein the seventh training sequence is generated by using a Zadoff-Chu-sequence with different root to the first training sequence and the second training sequence.

22. The base station according to claim 12, wherein the communication system is a time-reversal division multiple access (TRDMA) system.

* * * * *